2 Sheets—Sheet 1.

W. A. REIMERS & J. BIERBAUER.
Traveling-Brush for Middlings-Purifiers.
No. 223,950. Patented Jan. 27, 1880.

WITNESSES:
T. S. West
Cornelius Cox

INVENTORS.
W. A. REIMERS,
J. BIERBAUER,
BY H. W. Beadle & Co.
ATTYS

2 Sheets—Sheet 2.

W. A. REIMERS & J. BIERBAUER.
Traveling-Brush for Middlings-Purifiers.
No. 223,950. Patented Jan. 27, 1880.

WITNESSES:
T. S. West
Cornelius Cox

INVENTORS:
W. A. REIMERS,
J. BIERBAUER,
BY H. W. Beadle & Co.
ATTYS.

UNITED STATES PATENT OFFICE.

WILLIAM A. REIMERS AND JACOB BIERBAUER, OF MANKATO, MINNESOTA.

TRAVELING BRUSH FOR MIDDLINGS-PURIFIERS.

SPECIFICATION forming part of Letters Patent No. 223,950, dated January 27, 1880.

Application filed June 19, 1879.

*To all whom it may concern:*

Be it known that we, WILLIAM A. REIMERS and JACOB BIERBAUER, of Mankato, county of Blue Earth, and State of Minnesota, have invented new and useful Improvements in Traveling Brushes for Middlings-Purifiers; and we do hereby declare that the following is a full and exact description of the same, reference being had to the accompanying drawings, and to the letters of reference marked thereon.

This invention relates to that class of middlings-purifiers which are provided with traveling brushes for sweeping the bolting-cloth; and it consists, mainly, in certain details by means of which simplicity of construction is obtained, together with efficiency of operation.

Figure 1:
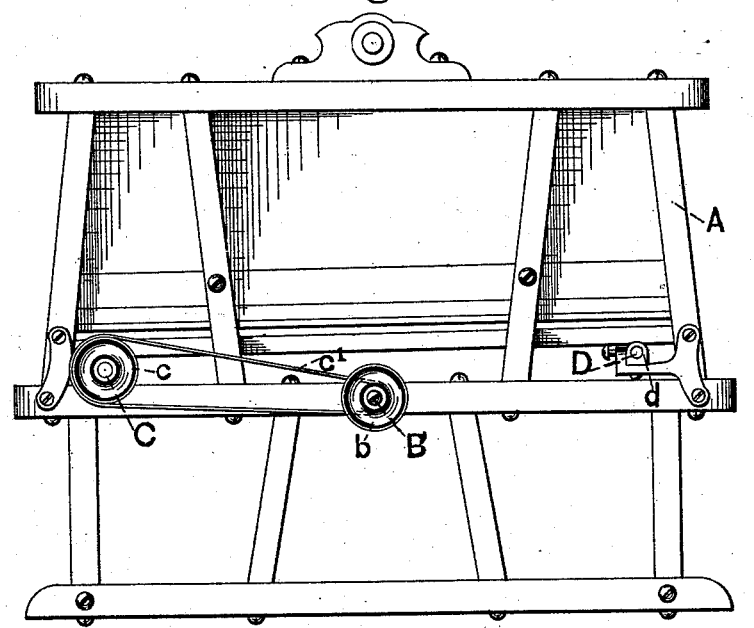
Figure 2:
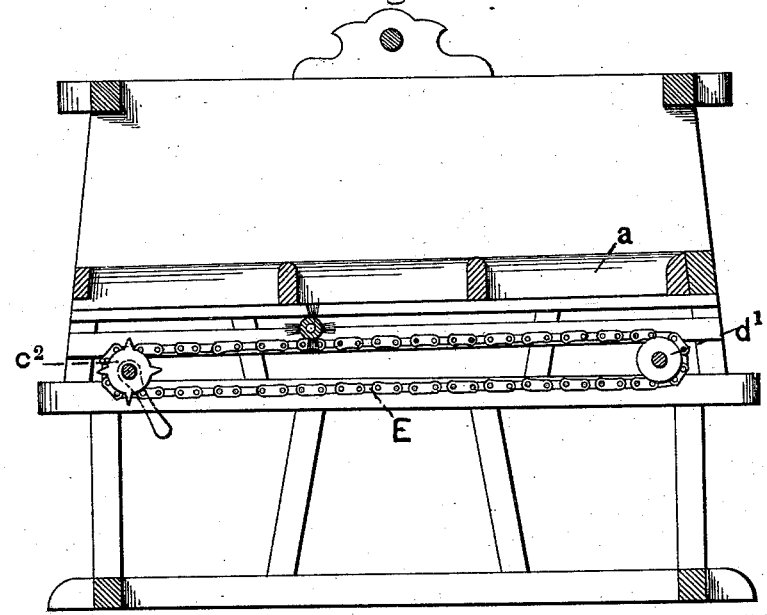
Figure 3:
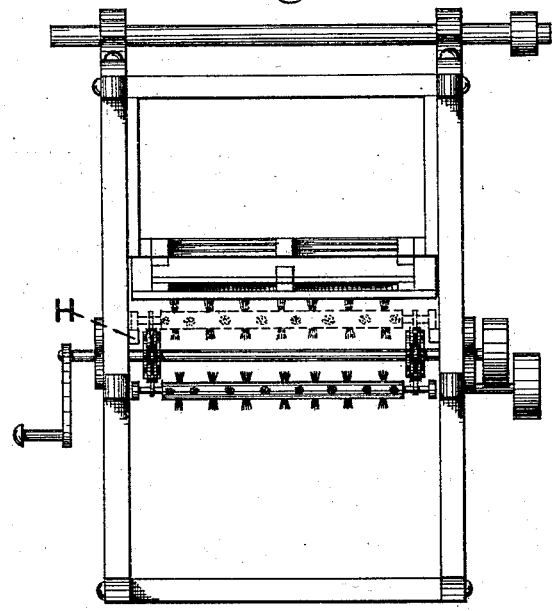
Figure 4:
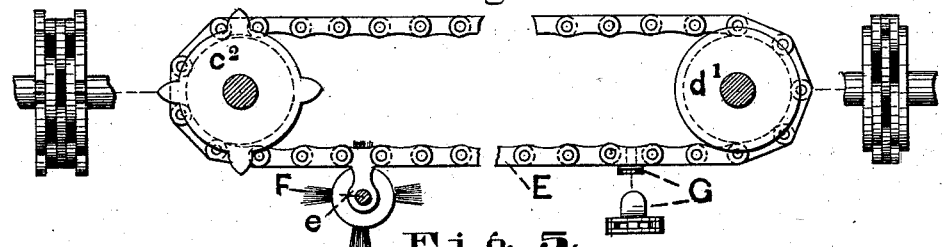
Figure 5:
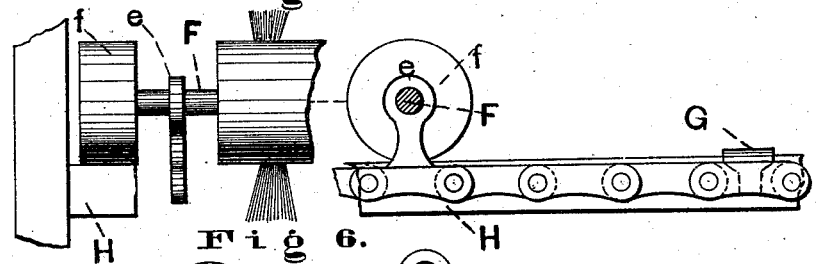
Figure 6:
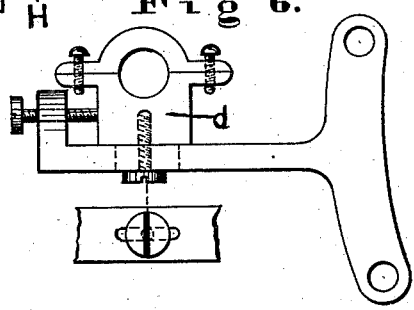

In the drawings, Figure 1 represents a side elevation of our improved machine; Fig. 2, a longitudinal sectional elevation of the same; Fig. 3, an end elevation of the same; Fig. 4, various views of the chain-belt and its supports; Fig. 5, various views of the traveling brush, and Fig. 6 an enlarged view of the adjustable bearing.

A, Fig. 1, represents a machine of any proper construction, and $a$, Fig. 2, a frame upon which the bolting-cloth is secured in the usual well-known or any other proper manner. B, Fig. 1, represents a shaft having a pulley, $b$, for receiving motion directly or indirectly from the main source of power, and also a smaller pulley for communicating motion to the brush mechanism at a lower rate of speed, in the manner well understood. C represents a shaft held in proper bearings upon the frame-work at one end of the machine below the bolting-cloth, which is provided with a pulley, $c$, for receiving motion, by means of the belt $c'$, from the small pulley of shaft B, as shown. D also represents a shaft held in proper bearings upon the frame-work at the opposite end of the machine to that at which the shaft C is located, as shown. The bearings of this shaft are preferably made adjustable by means of a movable journal-box, $d$, as shown.

$c^2 c^2$, Figs. 2 and 4, represent sprocket or chain wheels located at the proper points upon the shaft C, and $d' d'$ grooved wheels correspondingly located upon the shaft D, as shown.

E E represent chain-belts located upon the wheels $c^2 d'$, which are provided at proper points opposite each other with boxes $e e$, Figs. 4 and 5, adapted to hold the journals of the brush-shaft, as shown. F represents this brush-shaft, which may be constructed, generally, in any proper manner, but is essentially provided at its ends with wheels $f f$, Fig. 5, fixed upon the shaft, as shown. G G, Figs. 4 and 5, represent scrapers located upon the chain-belts in front of the brush-shaft, as shown. H H represent ways upon the sides of the machine, which are located at the proper points to cause the brushes to bear properly upon the bolting-cloth when the wheels of the brush-shaft travel thereon.

The operation is substantially as follows: Motion having been given to the machine, the shaft C will be caused to revolve and give movement to the chain-belts. By means of these the brush-shaft will be caused to travel across the machine from end to end, first in one direction in contact with the bolting-cloth, as indicated in Fig. 2, and then in the other, removed from contact with it, as indicated in Fig. 4. When in contact with the cloth the brush-shaft receives a revolving movement from the friction of the wheels at its ends upon the ways. In this manner the bolting-cloth, when the machine is in operation, is swept at regular intervals by the revolving brushes. The scrapers move before the wheels of the brush-shaft and take from the rails anything that may have lodged thereon, in consequence of which the brush-shaft is caused to exert always a uniform pressure against the bolting-cloth.

If desired, V-shaped ways, instead of flat ones, may be employed, in which case correspondingly-shaped wheels should be used. By means of the adjustable journal-boxes the wear of the chain-belts may be taken up, if desired.

Some of the advantages of the described construction are as follows: By means of the chain-belts located at the ends of the brush-shaft the latter is caused to move uniformly without undue friction. By means of the ways and scrapers the brushes are caused to exert a uniform pressure against the bolting-cloth at all times.

Having thus described our invention, what we claim as new, and desire to secure by Letters Patent, is—

1. In combination with the revolving brush-shaft, endless actuating-belts E, located at the ends of the shaft, and carrying journals for the same, and means, substantially as described, for guiding the brush-shaft.

2. In combination with the brush-shaft having the wheels at its ends, the ways and scrapers, as described.

3. The combination of the following elements: a brush-shaft adapted to revolve, endless chain-belts E, carrying journals for the ends of the shaft, supporting-wheels $c^2$ $d'$, and ways H, as described.

This specification signed and witnessed this 12th day of May, 1879.

W. A. REIMERS.
J. BIERBAUER.

Witnesses:
HENRY HILLESHEIM,
Q. LEONARD.